United States Patent Office 2,740,743
Patented Apr. 3, 1956

2,740,743
METHOD OF MAKING SYNTHETIC RESIN FOAM STRUCTURES

Henry A. Pace, Akron, Ohio, assignor, by mesne assignments, to The Goodyear Tire & Rubber Company, a corporation of Ohio No Drawing. Application December 31, 1952, Serial No. 329,141

7 Claims. (Cl. 154—140)

This invention relates to an expanded cellular material, to a method of producing an expanded cellular material and to articles fabricated from such material. More particularly, this invention relates to an expanded cellular resin composition.

Foamed resin core materials have been previously prepared. However, these prior materials have not been satisfactory for some purposes. In certain applications, such as the fabrication of radar housings, aircraft components and guided missile parts, a critical combination of properties is required. The products of the present invention are outstanding for such highly specialized uses, as well as for other purposes because the products of the present invention have great rigidity, controlled density, fine cell structure, high impact resistance, excellent electrical properties and are capable of withstanding extremes of heat and cold.

It is an object of this invention to produce a foamable material whose properties can be consistently reproduced.

It is another object of this invention to produce a uniform, tough, rigid foam.

It is a further object of this invention to fabricate an internally foamed structure having strong adhesion between the foam and structure walls plus high impact resistance and good electrical transparency, i. e., the ability to transmit an electrical impulse without diminution or deviation.

It is another object of this invention to fabricate an internally foamed structure capable of withstanding severe extremes of thermal and structural distortion.

Other objects and advantages will be apparent as the description proceeds.

Processes for the preparation of cellular or porous resins include the introduction of an inert gas into a resin in a confined space and suddenly releasing the pressure, the incorporation of a material which decomposes or reacts chemically under specific conditions to yield expanding gas, the use of volatile solvents which may be removed at elevated temperatures and reduced pressures, and various combinations of these processes. The practice of the present invention involves the production of an improved foam by means of the incorporation of a secondary foaming agent in a foaming system in addition to a primary foaming agent. The secondary foaming agent must be capable of generating a nonreactive gas at a higher temperature than the blowing temperature of the primary foaming agent.

This invention may be practiced with various polyester resins known as alkyd resins, these being the condensation products of polyhydric alcohols and polycarboxylic acids. Representative polyhydric alcohols which can be used in preparing alkyd resins for use in the practice of this invention are ethylene glycol, triethylene glycol, propylene glycol, dipropylene glycol, hexamethylene glycol, and glycerol. Representative carboxylic acids which can be used in preparing alkyd resins by reaction with any of the above mentioned polyhydric alcohols and other alcohols are phthalic, isophthalic, terephthalic, succinic, adipic, sebacic, maleic, fumaric, 2-phenyl glutaric, citric, citraconic, mesaconic, itaconic, oxalic, malonic, glutaric, pimelic, suberic, azelaic and sebacic acids. Also, certain monofunctional modifiers can be incorporated in the resin. The ratio of alcohol to acid is generally determined according to the proportion of hydroxyl and carboxyl groups desired in the alkyd resin formed therefrom. In order to have sufficient carboxyl radicals available to react with the isocyanates it is desirable to keep the acid number of the alkyd resin within a range of 35 to 45.

In practicing this invention, an unsaturated polymerizable compound, such as styrene, can be mixed with the alkyd resin. Generally, warming the mixture to about 50° C. is sufficient to produce a clear compatible solution. To this solution, after cooling, a polymerization catalyst may be added, organic peroxides being the most satisfactory.

A filler may be added to the mixture as a means of increasing the viscosity to prevent loss of gas and to create a finer cell structure. Also, the filler is added as a means of increasing adhesion between the unitary foam cells and between the foam and other materials. Any finely divided, nonreactive filler may be used, such as flocculated cellulose, lamp black, carbon black, mica powder, silicic acid and walnut shell flour.

Although not necessary for operability, the addition of a small amount of water aids the production of foam. Usually about 1% to 5%, based on the total batch weight, is sufficient.

An emulsifying agent can be added in order to secure better dispersion of blowing ingredients and a better dispersion of any added water which insure a more uniform foam. Also, an emulsifying agent helps obtain complete, homogeneous foaming action.

Preferably, the primary foaming agent employed is an isocyanate, such as 2,4-tolylene diisocyanate. Other diisocyanates such as methylene diphenyl diisocyanate, p,p'-diphenyl diisocyanate, hexamethylene diisocyanate and 1,5-naphthalene diisocyanate can be used in the practice of this invention. These isocyanates react chemically with the other ingredients, principally with the carboxyl groups of the alkyd resins, with the alcoholic hydroxyl groups of the alkyd resins and with water which may be present in the system or which may be added. Carbon dioxide is generated within the mixture by the reaction of the isocyanates with the carboxyl groups of the alkyd resins as well as with the water. These reactions are believed to proceed as follows:

1.

$$R-OH + R'-NCO \longrightarrow R-O-\overset{O}{\underset{\|}{C}}-\overset{H}{\underset{|}{N}}-R'$$

2.

$$R-\overset{O}{\underset{\|}{C}}-OH + R'-NCO \longrightarrow R-\overset{O}{\underset{\|}{C}}-\overset{H}{\underset{|}{N}}-R' + CO_2$$

3. (a)

$$HOH + R'-NCO \longrightarrow R'-\overset{H}{\underset{|}{N}}-\overset{O}{\underset{\|}{C}}-OH \longrightarrow CO_2 + R'NH_2$$

(b)

$$R'NH_2 + R''NCO \longrightarrow R''N\overset{O}{\underset{\|}{H}C}-NHR'$$

In the foregoing, R, R' and R'' may be aliphatic or aromatic radicals.

In the practice of the invention, dinitrosopentamethylenetetramine is preferred as the secondary blowing agent. The effect is to materially improve the quality of the foam structure and to produce a light-colored foam with good electrical transmissibility. The structure of dinitrosopentamethylenetetramine is given by Beilstein, vol. 1, page 589, as $C_5H_{10}O_2N_6$, or

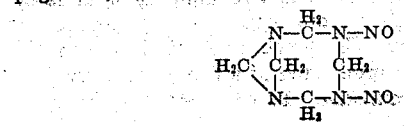

or

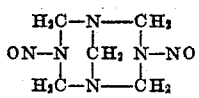

Dinitrosopentamethylenetetramine decomposes at about 150° C. to liberate gaseous nitrogen products. Since the primary blowing agents, the isocyanates, react at temperatures as low as 25° C. to 50° C., and up to 150° C., the primary blow is substantially advanced prior to decomposition of the dinitrosopentamethylenetetramine. However, since the secondary blow is actually initiated by the heat generated by the exothermic reaction of the primary blow, there is an overlapping of the primary and secondary gas evolution steps. Thus, the secondary blow is, in effect, a booster. The overlapping of the gas evolution stages is very desirable because it starts the pore formation within wall structures created by the primary blow before gelation occurs. This is necessary because gas evolution after gelation would tend to rupture the foam structure. Thus, the evolution of gas from the dinitrosopentamethylenetetramine particles which have been distributed in the cell walls during the primary blow gives rise to new cells which occupy the space previously occupied by the large cells resulting from the primary blow. The resulting product is a more highly cellular foam which is sturdier because the cells are small. This fine pore formation cannot be brought about by the use of either the primary or secondary blowing agent alone but is the combined effect of both.

Alkyd resins having an acid number of 35 to 45 are preferred in the practice of this invention. Those resins having an acid number of about 38 to 42 usually give a foam with the finest texture. A foaming resin prepared from dipropylene glycol maleate is particularly preferred as is also that from diethylene glycol maleate.

Styrene is preferred as the monomer to be added to the alkyd resin. Diallyl phthalate also can be used in preparing the copolymer. These materials impart greater impact strength to the final foamed product and also make handling easier by lowering the viscosity. In addition, they improve electrical transmission. Styrene is particularly preferred because it and its derivatives have low dielectric constants. In preparing the mutual solution of alkyd resin and styrene, the weight ratio of styrene to alkyd resin may vary from 7:93 to 40:60. Preferably a weight ratio of about 35 percent styrene and 65 percent alkyd resin is used.

In practicing the invention, the emulsifier, the filler and the secondary blowing agent, e. g., dinitrosopentamethylenetetramine, are stirred together until homogeneity is achieved. Although any non-reactive emulsifier may be used, a 10% water solution of sodium lauryl sulfonate or sodium alkyl naphthalene sulfonate is preferred as the emulsifier. These solutions serve as foaming aids by bringing about more complete dispersion of the water within the foaming mixture thereby creating a more uniform foaming condition. About 10 milliliters of the 10 percent emulsifier-water solution in 300 grams of foamable resin is employed.

Any non-reactive pulverulent material can serve as a filler, e. g., flocculated cellulose, lamp black, carbon black, mica and silicic acid. Two hundred mesh walnut shell flour is preferred. About 5% to 15% of filler, based on the weight of the foaming resin, can be used but best results are obtained by using about 8 to 10 percent by weight.

The inclusion in the foaming system of dinitrosopentamethylenetetramine as a booster or secondary foaming agent in addition to the primary foaming agent, an isocyanate, makes possible more reproducible properties and control of density. The practice of this invention also makes possible the production of a fine celled electrically transparent core material. Based on the weight of the foaming resin, about 3% to 10% of dinitrosopentamethylenetetramine can be used, although 5% to 7% is preferred.

In practicing the invention, the previously prepared mixture of emulsifier, filler, catalyst, dinitrosopentamethylenetetramine and alkyd resin is mixed with the active foaming material, the diisocyanate, and stirred until homogeneous. When the mixing is completed, the foaming system is ready for use. The active foaming agent may be selected from a group of isocyanates comprising 2,4-tolylene diisocyanate, methylene diphenyl diisocyanate, p-p′-diphenyl diisocyanate, hexamethylene diisocyanate and 1,5-naphthalene diisocyanate. A preferred compound is 2,4-tolylene diisocyanate. Based on the weight of foaming resin, about 5% to 15% of diisocyanate can be added. Preferably, about 10% is added because more than this amount is wasteful and less than this amount gives a foam of higher density which is not usually desirable.

A polymerization catalyst can be added to create a more rapid, uniform foaming and gelling. Organic peroxides are normally used for this purpose, e. g., benzoyl peroxide, p-tertiary-butyl hydroperoxide, di-tertiary-butyl peroxide, urea peroxide, chlorobenzoyl peroxide and 2,4-dichlorobenzoyl peroxide. Benzoyl peroxide is preferred. Based on the weight of the resin foamable solution, about 2% to 5% of organic peroxide addition is beneficial and about 3% to 4% is preferred.

The formulation thus prepared can be balanced to provide a foam which varies in density from 8 to 15 pounds per cubic foot. For the purposes indicated, a foam density of 9 to 11 pounds per cubic foot is preferred.

Various materials can be used to form the walls of a foamed-in-place laminated structure. Some of these materials are laminated glass fiber sheets, plywood, wood veneer, aluminum, steel, etc. In the practice of this invention, laminated glass fiber sheets are preferred.

The following examples are given as illustrations and are not intended as limitations on the scope of the invention.

EXAMPLE 1

A foaming material was prepared from the following ingredients:

195 grams alkyd resin
105 grams styrene
10 grams benzoyl peroxide
25 grams walnut shell flour
10 milliliters sodium lauryl sulfonate solution (10% in water)
15 grams dinitrosopentamethylenetetramine
30 grams 2,4-tolylene diisocyanate The alkyd resin was prepared by condensing together dipropylene glycol and maleic acid to give a condensation product having an acid number of 40. The walnut shell flour and the dinitrosopentamethylenetetramine were capable of passing through a 200 mesh screen.

The styrene was dissolved in the alkyd resin by warming the mixture to about 50° C. This mixture was then cooled and the solid benzoyl peroxide was dissolved therein. In a separate container, the sodium lauryl sulfonate was stirred into the walnut shell flour and then the dinitrosopentamethylenetetramine was added. This mixture was then stirred into the alkyd-styrene solution and allowed to stand for about one half hour. Thereafter, the active foaming ingredient, 2,4-tolylene diisocyanate, was introduced and the material foamed by heating to about 80° to 90° C. As the diisocyanate reaction took place, the temperature of the foaming system was gradually elevated due to the exothermic nature of the reaction until it reached a temperature of about 125° C. to 150° C. This started the decomposition of dinitrosopentamethylenetetramine. Since much of the dinitrosopentamethylenetetramine was trapped in the cell walls created by the diisocyanate blow, liberation of nitrogen products from the dinitrosopentamethylenetetramine caused expansion within the walls, thus tending to close the cells and create more small cells. The resulting product was a sturdy void-free cellular resinous product with a density of about 10 pounds per cubic foot. The cell uniformity, toughness, and electrical transmission were far superior to foams prepared without the booster.

EXAMPLE 2

A radar canopy was constructed as follows:

An iron female mold about 2 inches thick was cast and hand ground to a close tolerance. A male mold was made in the same manner. Glass fiber laminated skins about .030 inch thick were prepared in a separate mold by impregnation with a resinous material. The female mold was lined with such a skin. A foaming mixture prepared as shown in Example 1 was placed on the skin in the bottom of the cavity. Thereafter, the male mold, with another skin placed thereon, was lowered into place and the assembly was clamped with heavy bolts. Foaming was then completed by heating at a temperature of 100° C. for one hour and 150° C. for one hour. An even temperature was obtained throughout by running pipes about the outside of the mold and heating by hot water. As the foaming was completed, internal pressures of 25 to 30 pounds per square inch were measured. Visual inspection and light tapping indicated that this radome was completely free of separations between the skin and core and was very sturdy. Weight tests indicated that the core material had a density of 10 pounds per cubic foot.

While certain representative embodiments and details have been shown for the purpose of illustrating the invention, it will be apparent to those skilled in this art that various changes and modifications may be made therein without departing from the spirit or scope of the invention.

I claim:

1. The process of producing a resin foam which comprises admixing a foamable unsaturated alkyd resin, styrene and dinitrosopentamethylenetetramine and an organic peroxide polymerization catalyst, and then dispersing in said mixture an organic diisocyanate and heating to a temperature of at least 50° C. until foaming is completed.

2. The process of producing a resin foam which comprises admixing an unsaturated alkyd resin, styrene, an organic peroxide polymerization catalyst, water and dinitrosopentamethylenetetramine, and then dispersing in said mixture 2,4 tolylene diisocyanate, and heating to a temperature of at least 50° C. until foaming is completed.

3. The process of producing a resin foam which comprises mixing an unsaturated alkyd resin selected from the group consisting of dipropylene glycol maleate, and diethylene glycol maleate with styrene, an organic peroxide polymerization catalyst, and dinitrosopentamethylenetetramine, and then dispersing in said mixture 2,4 tolylene diisocyanate, and heating to a temperature of at least 50° C. until foaming is completed.

4. The process of producing a resin foam which comprises admixing an unsaturated alkyd resin having an acid number between 35 and 45, styrene, a polymerization catalyst selected from the group consisting of benzoyl peroxide, t-butyl hydroperoxide, di-t-butyl peroxide, urea peroxide, chlorobenzoyl peroxide and 2,4 dichlorobenzoyl peroxide, and dinitrosopentamethylenetetramine and then dispersing in said mixture, 2,4 tolylene diisocyanate, and heating to a temperature of at least 50° C. until foaming is completed.

5. The process of producing a resin foam which comprises admixing an unsaturated alkyd resin having an acid number between 35 and 45, styrene, benzoyl peroxide, sodium lauryl sulfonate and dinitrosopentamethylenetetramine, and then dispersing in said mixture 2,4 tolylene diisocyanate, and heating to a temperature of at least 50° C. until foaming is completed.

6. The process of producing a resin foam which comprises admixing from 40% to 60% by weight of an unsaturated alkyd resin having an acid number between 35 and 45, from 20% to 35% by weight of styrene, from 1% to 5% by weight of an organic peroxide polymerization catalyst, from 3% to 6% by weight of dinitrosopentamethylenetetramine, and then dispersing in said mixture from 5% to 10% by weight of an organic diisocyanate, and heating to a temperature of at least 50° C. until foaming is completed.

7. The process of preparing an expanded resin foam comprising the steps of (1) preparing an unsaturated alkyd resin having an acid number between 35 and 45, (2) dissolving said alkyd resin in from 20% to 35% by weight of styrene, (3) adding from 1% to 5% by weight of an organic peroxide polymerization catalyst, (4) adding a two-component blowing agent to said alkyd resin-styrene solution, said blowing agent being comprised of an organic diisocyanate and dinitrosopentamethylenetetramine, (5) maintaining said mixture at a temperature of at least 50° C. to initiate and sustain the reaction between the diisocyanate and the alkyd resin-styrene solution in order to release carbon dioxide as a blowing agent and continuing said reaction until the diisocyanate is substantially exhausted, (6) elevating the temperature of said mixture to at least 100° C. and maintaining the same to decompose the dinitrosopentamethylenetetramine while the previously expanded alkyd resin-styrene composition is in a semi-gelled state and (7) continuing a temperature of at least 100° C. until all of the dinitrosopentamethylenetetramine has decomposed and the alkyd resin-styrene composition has become rigid.

References Cited in the file of this patent

UNITED STATES PATENTS

| | | |
|---|---|---|
| 2,491,709 | Briggs et al. | Dec. 20, 1949 |
| 2,576,073 | Kropa et al. | Nov. 20, 1951 |
| 2,576,749 | Carpentier | Nov. 27, 1951 |
| 2,577,279 | Simon et al. | Dec. 4, 1951 |
| 2,608,536 | Sterling | Aug. 26, 1952 |
| 2,614,059 | Cooper | Oct. 14, 1952 |
| 2,642,403 | Simon et al. | June 16, 1953 |